Sept. 7, 1965  H. E. KALLMANN  3,204,455
ULTRASONIC FLOWMETER
Filed Sept. 27, 1961  2 Sheets-Sheet 1
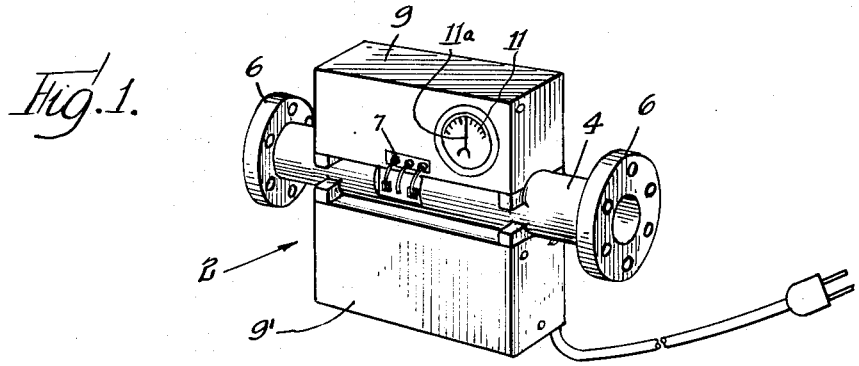
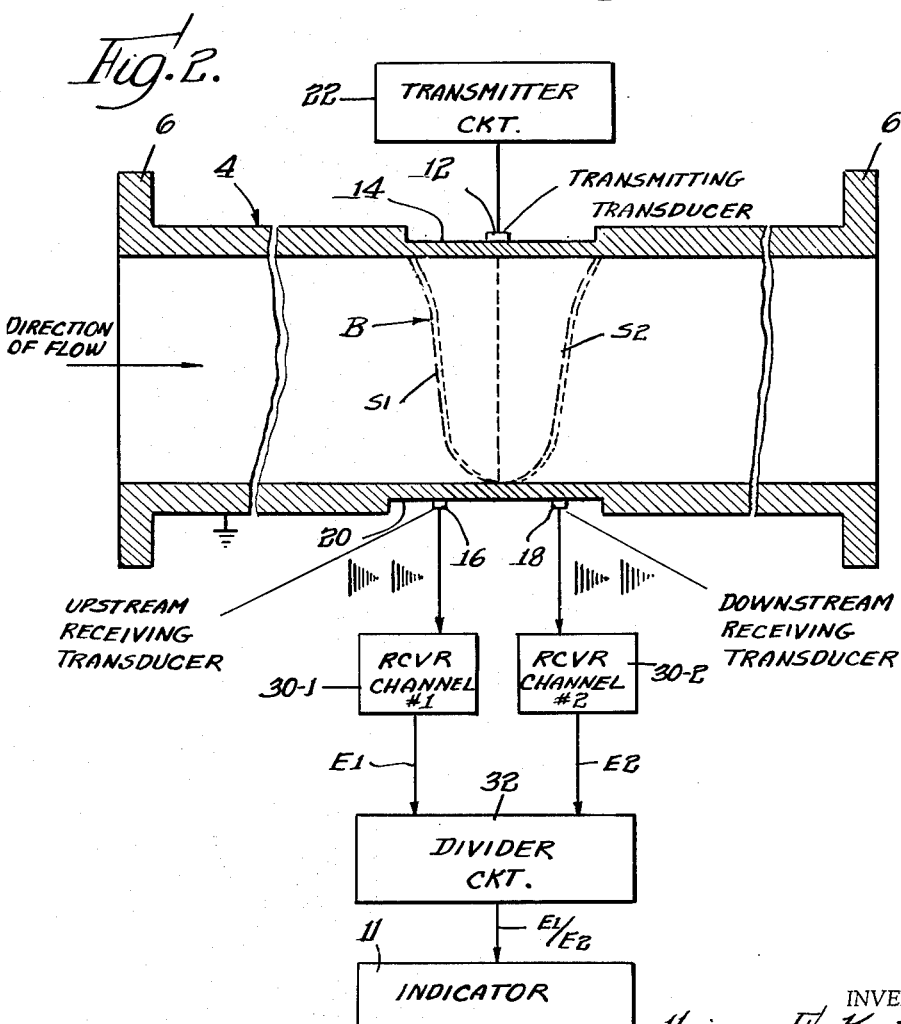
INVENTOR.
Heinz E. Kallmann
BY
Attys.

Sept. 7, 1965  H. E. KALLMANN  3,204,455
ULTRASONIC FLOWMETER
Filed Sept. 27, 1961  2 Sheets-Sheet 2

INVENTOR.
Heinz E. Kallmann
BY
Wellington, Greenberg & Hale
Attys.

United States Patent Office 3,204,455
Patented Sept. 7, 1965

3,204,455
ULTRASONIC FLOWMETER
Heinz E. Kallmann, New York, N.Y., assignor to Gulton Industries, Inc., Metuchen, N.J., a corporation of New Jersey
Filed Sept. 27, 1961, Ser. No. 141,180
1 Claim. (Cl. 73—194)

This invention relates to ultrasonic flowmeters of the beam deflection type.

In recent years a new form of flowmeter was proposed operating on the deflection of an ultrasonic beam directed across a conduit carrying the fluid involved by the movement of the fluid in the conduit. The degree of deflection of the beam provides a measure of the rate of flow of the fluid. All of the signal transmitting and receiving components are located on the outside of the conduit involved, so that no flow restrictions or corrosion problems are involved. A piezo-electric transmitting transducer is mounted on the outside of a section of pipe carrying the fluid to be measured, and a pair of longitudinally spaced piezo-electric receiving transducer elements are mounted on the outside of the pipe a substantial distance downstream from the transmitting transducer element, the wall thickness at the point of attachment of the transducers thereto being a multiple of a half wave length at the frequency of the ultrasonic waves to be generated. The transmitting transducer provides a directive beam pattern and is oriented so that the beam makes a substantial angle with a transverse line so that the beam is transmitted at an angle downstream where it is reflected off the pipe walls several times before reaching the receiving transducer elements. The outputs of the receiving transducer elements are directly or indirectly differentially connected so that a measurement is obtained of the difference of the amplitudes of the ultrasonic signals intercepted by the receiving transducer elements, which measurment indicates the fluid flow rate. Under no flow conditions the measurement is zero because the receiving transducers intercept similar signals. Under flow conditions a finite differential measurement is obtained due to the deflection of the beam downstream which causes different ultrasonic signals to impinge upon the receiving transducer elements. The accuracy of this flowmeter depends upon the maintenance of a fixed amplitude of the transmitted ultrasonic signal and a constant absorption characteritsic of the fluid. This requirement is difficult and under many circumstances impractical to satisfy. Variations in voltage conditions in the transmitter circuit feeding the transmitting transducer element and variation in the liquid being measured will, of course, prevent the maintenance ofthe aforesaid conditions.

It is, accordingly, an object of the present invention to provide an improved ultrasonic flowmeter of the beam deflection type wherein the accuracy of the results is substantially independent of the amplitude of the transmitted ultrasonic signal or the absorption characteristics of the fluid involved.

In accordance with the present invention, it has been discovered that the rate of flow of fluid through the flowmeter system above described is obtained if the receiving transducer elements are positioned to intercept oppositely substantially similar linearly sloping sections of the ultrasonic beam over the range of fluid velocities to be measured, and, further, where a measure is obtained of the ratio (i.e. quotient) rather than the difference of the outputs of the receiving transducer elements. By utilizing the ratio of the outputs of the receiving transducer elements as a measure of the fluid velocity, it has been found that variations in the amplitude of the transmitted ultrasonic beam and the absorption characteristics of the fluid do not affect the accuracy of the fluid flow measured to any significant degree.

The aforesaid and other objects, features and advantages of the invention will become more apparent upon making reference to the specification to follow, the claim and the drawings wherein:

FIG. 1 is a perspective view of the physical components making up a beam deflection type flowmeter which incorporates features of the present invention;

FIG. 2 is an enlarged sectional view through the pipe or conduit portion of the flowmeter shown in FIG. 1 showing the relationship of the transmitting and receiving transducers and includes a box diagram of the basic circuit components utilized with the transducer elements in the application of the present invention;

Figure 3:
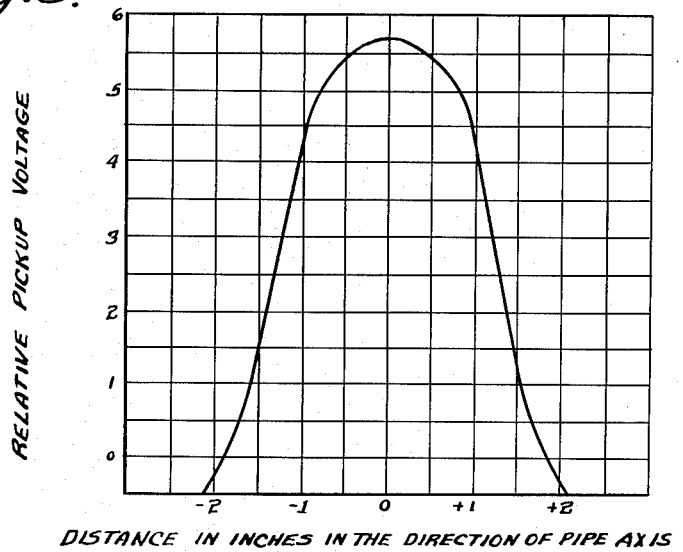
Figure 4:
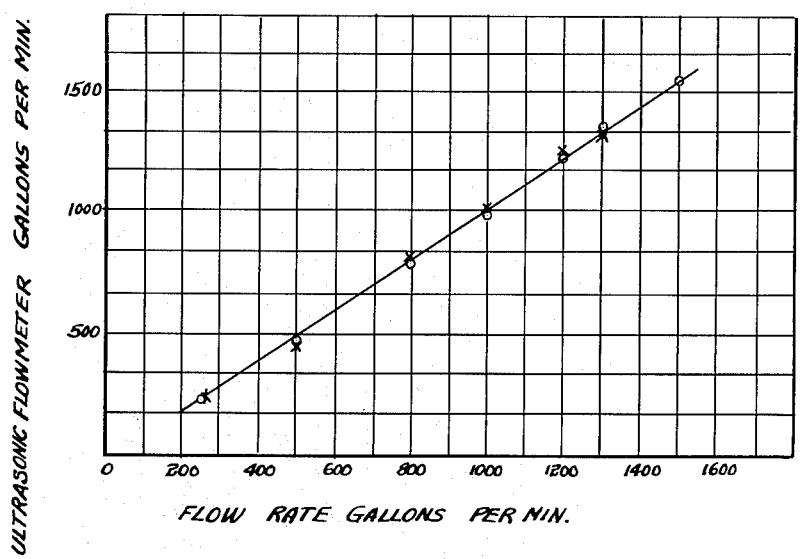

FIG. 3 is a curve illustrating the beam pattern resulting from the acoustic transmitted pulse and echo pulsation in terms of the relative signal strengths intercepted at difference points along the pipe on which the receiving transducers are mounted under no flow conditions; and FIG. 4 is a curve showing the linearity and repeatability of the fluid flow measurements using a flowmeter incorporating the features of the present invention and a standard calibrated flowmeter to determine the actual flow rates involved.

Referring now to FIG. 1, the beam deflection type flowmeter there shown is an integral unit 2 designed to be connected between two pipe sections in a pipe system carrying the fluid to be measured. The flowmeter unit 2 includes a pipe section 4 having flanges 6—6 at the ends thereof with bolt or screw-receiving holes therein for connecting the same to similarly flanged portions of a pair of pipes (not shown). The aforementioned transmitting and receiving transducers are adhesively or otherwise secured to the outside of the pipe section 4, and connecting wires 7 extend from these transducer elements to electrical transmitting and receiving circuitry contained in upper and lower housing sections 9 and 9' between which the pipe section 4 extends. The transmitting and receiving circuitry could be located at a point remote from the pipe section 4, but for most purposes it is convenient to make the flow measuring apparatus as an integral unit. The upper housing section 9 includes a direct current meter 11 having a pointer 11a which normally assumes a centered zero position under no flow conditions, and is deflected to the right of this position to a degree dependent on the flow rate when fluid flows through the pipe section 4 in one direction, and to the left of this position to a degree dependent on the flow rate when the fluid flows through the pipe section in the opposite direction.

Reference should now be made to FIG. 2 which illustrates the invention involved. The transmitting transducer, which is indicated by reference numeral 12, comprises a piezo-electric crystal of quartz, barium titanate, lead-zirconate titanate or the like. In one instance, the crystal was a thin square plate one-half inch wide. The transmitting crystal 12 is mounted on a machine flat portion 14 of the pipe section which is parallel to the longitudinal axis thereof. The pipe section at this point preferably has a wall thickness which is a multiple of half wave lengths at the frequency of the ultrasonic waves to be transmitted therethrough. The thin transmitting crystal is mounted in face-to-face contact with the flat pipe portion 14 to direct an ultrasonic beam at right angles to the longitudinal axis of the pipe section which is in distinction to the inclination of the transmitted beam in the originally proposed flowmeter system outlined above.

A transmitter circuit 22 is provided for energizing the transmitting crystal 12 at an ultrasonic frequency, such as one megacycle (one million cycles per second). The transmitter circuit 22 preferably intermittently energizes the transmitting crystal resulting in pulsations of ultrasonic energy passing through the walls of the pipe section and into the fluid therein. Because of the substantially transverse direction of the transmitted signals, echoes of these pulsations will be received by the receiving crystals. The echo pulsations diminish in magnitude with time until they substantially disappear. The pulse repetition rate of the transmitter circuit is selected so that the echoes from a given transmitted ultrasonic pulsation substantially decay to zero before the transmission of the next transmitted pulsation.

It is most advantageous that the transmitting crystal 12 generate a directive beam having oppositely sloping segments of diminishing beam intensity where the echo pulsations are to contribute to the flow measurement as in the particular exemplary form of flowmeter shown in the drawings, the useful acoustic response pattern of interest (B in FIG. 2 and as shown in FIG. 3) is the one resulting from all of the ultrasonic pulses reaching the portion of the walls of the pipe upon which the receiving transducers are mounted. The oppositely sloping segments of the response pattern of interest are identified in FIG. 2 by reference characters S1 and S2. These segments have substantially identical linear portions, as indicated in the drawings. The receiving crystals 16 and 18 are positioned to intercept only parts of the substantially linear portions of these segments S1 and S2 of the beam over the range of flow rates to be measured. The receiving crystals 16 and 18 which may be thin plates of piezo-electric material like the transmitting crystal (only preferably narrower in the direction of the pipe axis) are mounted on a machined flat portion 20 on the pipe section 4 at a point diametrically opposite the point at which the transmitting crystal is mounted. The flat portion 20 is parallel to the longitudinal axis of the pipe section 4 and forms a wall having a thickness which is a multiple of half wave lengths at the frequency involved. The receiving crystals 16 and 18 are positioned respectively upstream and downstream about the same distance from the transmitting crystal where, under no-flow conditions, they are positioned to intercept the center points of the corresponding linear portions of the segments S1 and S2. Since the transmitted ultrasonic beam is directed transversely of the pipe axis, and the acoustic response pattern B is symmetrical with respect to the axis thereof, longitudinal movement of the beam by the transmitted movement of fluid in the pipe section 4 will result in an increase in the signal amplitude intercepted by the downstream receiving crystal and a similar decrease in the signal amplitude intercepted by the upstream receiving crystal provided the linear portion of the response pattern remain opposite the receiving crystals. This similar increase and decrease of the signals received by the latter crystals upon movement of fluid through the pipe section is not obtained when the transmitted beam is directed at an angle to a transverse line where the crystals are not spaced along a line which is substantially transverse to the direction of propagation of the signals, and a loss of sensitivity results in such case.

The degree of beam deflection obtained in one test for a flow rate of 2,000 gallons per minute of water through a pipe section having an 8 inch inside diameter (which is a flow velocity of 12.8 feet per second) was approximately 0.021 inch. This small degree of beam deflection is readily detected by the receiving crystals.

The outputs of the receiving crystals are respectively fed to separate receiver channels 30-1 and 30-2 which amplify, rectify and filter the resultant output to provide direct current output voltages E1 and E2 which are respectively proportional to the magnitude of the ultrasonic signals received by the receiving crystals 16 and 18.

As previously indicated, in accordance with the present invention, the direct current outputs of the receiver channels 30-1 and 30-2 are fed to a suitable divider circuit 32 which provides at the output thereof a voltage which is a measure of the ratio of the two voltages. The divider circuit 32 most advantageously is the divider circuit disclosed in a copending application of Leonard Kleinberg entitled "Quotient Circuit," Serial No. 141,341, filed September 28, 1961, now Patent No. 3,112,720. In the case where the direction of flow is to the right is viewed in FIG. 2, the Kleinberg divider circuit 32 provides a voltage of a first polarity which is a measure of the flow rate involved. Where the direction of flow is to the left as viewed in FIG. 2, the Kleinberg divider circuit produces a negative voltage which is a measure of the flow rate involved. The direct current output of the divider circuit 32 is fed to a suitable meter or indicator 11 which is capable most advantageously of indicating voltages of both possible polarities. In accordance with the present invention, any suitable divider circuit may be utilized.

The relative linearity and repeatability of results utilizing the present invention is illustrated in FIG. 4 which indicates the results of two test runs made thirty minutes apart, one of the test runs being indicated by circles and the other test run being indicated by crosses. The resultant curve drawn to these points shows that the output is nearly linear. Deviation from linearity was only about ± one percent (1%) and the repeatability is better than ± two percent (2%) of full scale.

As previously indicated, the utilization of the division principle makes the results of the measurement substantially independent of the amplitude of the transmitted ultrasonic signal and the absorption characteristics of the fluid involved.

It should be understood that numerous modifications may be made of the preferred form of the invention described above without deviating from the broader aspects of the present invention.

What I claim as new and desire to protect by Letters Patent of the United States is:

An ultrasonic flowmeter of the beam deflection type comprising: a conduit for carrying fluid, ultrasonic transducer means mounted on the outside of said conduit and oriented to direct an ultrasonic beam through the conduit walls and substantially perpendicularly across the conduit, said beam producing a response pattern along a portion of the conduit which, measured along various points spaced longitudinally of the conduit, has a relatively flat, central, maximum intensity portion and relatively steep, oppositely, sloping, similar portions of progressively decreasing beam intensity proceeding away from the central, flat portion of the response pattern, said oppositely sloping portions having substantially linear regions, a pair of receiving transducer means positioned on the outside of said conduit at said portion of the conduit and spaced from one another along a line substantially perpendicular to the direction of propagation of the beam and located to intercept only different parts of the linear regions of the oppositely sloping different portions of the response pattern, respectively, for the various fluid flow rates to be measured, and flow indicating means including divider means for indicating the ratio of the amplitudes of the ultrasonic signals detected by said receiving transducer means.

References Cited by the Examiner

UNITED STATES PATENTS

| | | | |
|---|---|---|---|
| 2,833,298 | 5/58 | Shannon | 73—196 |
| 2,874,568 | 2/59 | Petermann | 73—194 |
| 2,946,220 | 7/60 | Cogniat et al. | 73—196 |
| 2,953,920 | 9/60 | Machlanski | 73—196 |
| 3,036,585 | 5/62 | Shawhan | 73—196 |

RICHARD C. QUEISSER, *Primary Examiner.*

ROBERT L. EVANS, *Examiner.*